Figure 2:
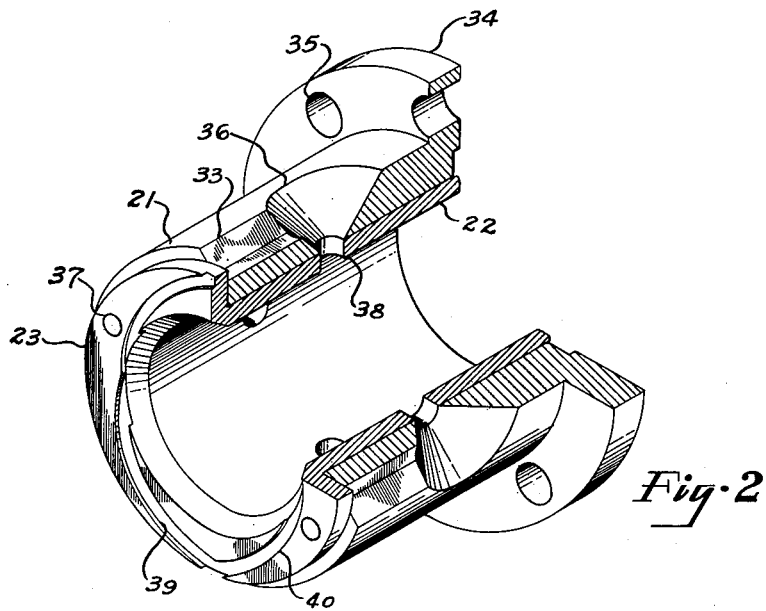

Nov. 8, 1955
W. C. CARROLL
2,723,168
LUBRICATED ROLLER
Filed Sept. 25, 1951
2 Sheets-Sheet 1
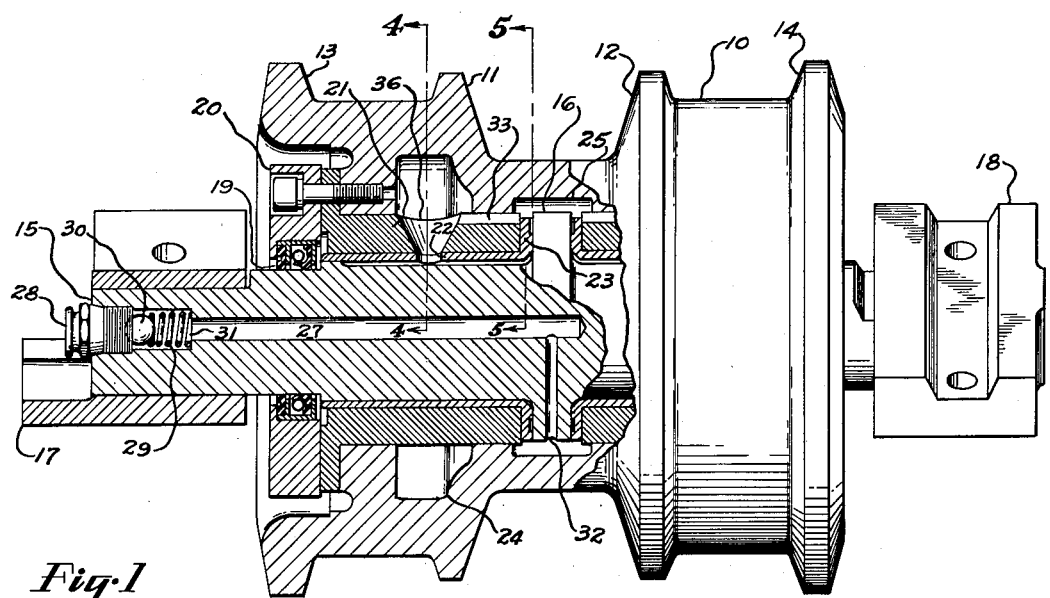
Fig. 1
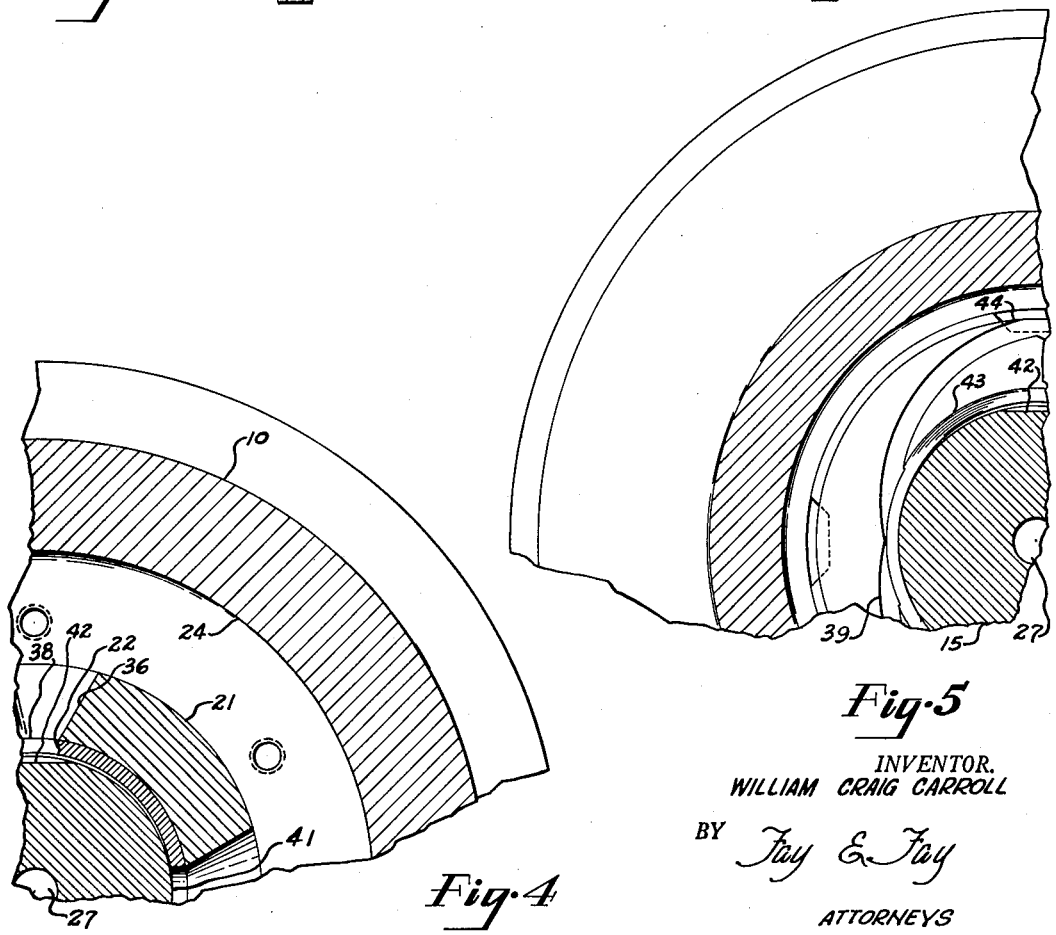
Fig. 4
Fig. 5
INVENTOR.
WILLIAM CRAIG CARROLL
BY Fay & Fay
ATTORNEYS Nov. 8, 1955  W. C. CARROLL  2,723,168
LUBRICATED ROLLER
Filed Sept. 25, 1951  2 Sheets-Sheet 2

INVENTOR.
WILLIAM CRAIG CARROLL
BY
*Fay & Fay*
ATTORNEYS

United States Patent Office 2,723,168
Patented Nov. 8, 1955

2,723,168

LUBRICATED ROLLER

William Craig Carroll, Portland, Oreg.

Application September 25, 1951, Serial No. 248,237

1 Claim. (Cl. 308—109)

This invention relates primarily to a novel design of track tractor roller generally employed with track laying tractors, or military vehicles, and uses a circuiting lubrication system that does not require a force feed pump. This new track tractor roller employs elastomer lip-type seals with large lubricant storage capacity within the shell of the track tractor roller, to permit storage and circulation of lubricant therethrough with a slight extrusion of lubricant past the lip-type seals, to flow away particles of dirt which may become embedded between the seal and the axle.

Further features of this track tractor roller include a circulation of the lubricant under a pressure differential from the large lubricant reservoirs radially inward to the bearing surface and outward through low pressure channels adjacent to the fixed portion of the shaft, to return to the lubricant reservoirs. Thus it may be seen that this novel design of track tractor roller employs a type of construction with more than the usual lubricant capacity, together with lubricant circulation. The cut-away portions in the bearing carrier members in addition to annular lubricant reservoirs within the shell of the track tractor roller provide large storage capacity which flows to the bearing surface and returns to the reservoirs by means of radial channels in the bearing flanges through lubricant ways in the bearing carrier members to the reservoirs.

An object of this invention is to produce a relatively low pressure track tractor roller which has large lubricant capacity within the roller and provides for circulation of this lubricant, together with a slight extrusion of lubricant past a seal to the exterior.

A further object of this invention is to provide a track tractor roller which will effectively control the flow of lubricant from lubricant reservoirs within the roller and will provide for circulation of the lubricant.

Other objects will be apparent from a detailed study of the invention which follows, but the invention consists in certain novel features in construction and combination of parts, which will be readily understood by those skilled in the art to which the invention appertains.

Figure 3:
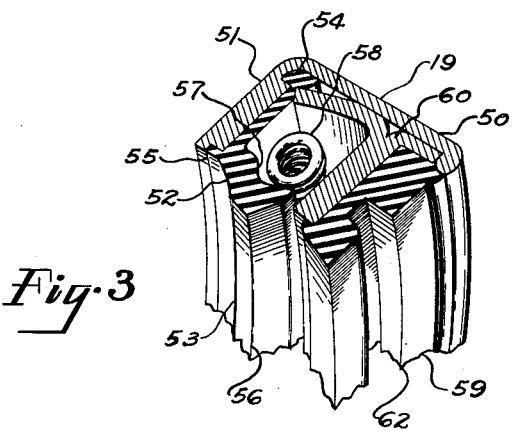

In the drawings, which illustrate one embodiment of the invention,

Fig. 1 is a fragmentary detailed view showing a longitudinal cross section of the track tractor roller, Fig. 2 is a detailed view in perspective of a bearing carrier and bearing carrier member with a quarter section cut away to show the construction of those members, Fig. 3 is a fragmentary detailed view in perspective of the double lip lubricant seal of this invention, Fig. 4 is a partial cross sectional view along the lines 4—4 of Fig. 1, showing the arrangement of the parts, particularly in the vicinity of the lubricant reservoirs, and Fig. 5 is a cross sectional view along the line 5—5 of Fig. 1, showing the end view of the bearing members and the lubricant passageway.

Fig. 1 shows a longitudinal cross-sectional view of a track tractor roller having a double flanged roller or outer housing member 10, having circular flanges 11 and 12 and outer flanges 13 and 14. The roller encompasses a non-rotating axle 15 which has an enlarged center thrust portion 16, and is secured to the track frame, not shown, by outer end mounting blocks 17 and inner mounting block 18. The roller and axle are joined by a seal and seal housing 19 and 20 respectively, which is bolted to the roller 10 through the bearing carrier member 21. Upon the bearing carrier members, of which there are two, there is a flanged bearing 22 which has a center flange 23 abutting the enlarged portion 16 of the axle 15. Within the roller 10 there are annular lubricant reservoirs designated 24 with a central lubricant reservoir 25 of lesser storage capacity. Connected to the larger lubricant reservoir 24 are cut-away portions in the bearing carrier member 21 and these are shown at 36. There are usually four of these cut-away portions in each bearing carrier member, which provide increased lubricant supply without weakening the structure of the bearing carrier member, while providing passageways through the bearing 22 to the bearing surface.

Lubricant supply is provided to these reservoirs and the bearing surface by means of a passageway or lubricant channel in the axle 27, and this passageway is connected by means of a lubricating fitting 28 and a check valve generally designated 29 consisting of a ball 30 and spring 31. The spring abuts against an enlarged portion of the lubricant channel 27. If by chance, the lubricant fitting should be accidentally knocked off, the lubricant within the system will not be discharged since the ball will close a reduced portion within the socket. This ball and socket, however, will not prevent the addition of lubricant at periodic intervals to replenish that which may be lost past the sealing arrangement. Briefly then at this point it should be stated that lubricant passes along the center of the axle in the lubricant channel 27 and radially outward through another channel at 32 to a lubricant reservoir 25. From this point the lubricant may pass along lubricant passageway 33 in the bearing carrier member to the enlarged lubricant reservoir 24. The details of the circulation of the lubricant will be explained in connection with the description of the detailed views of this track tractor roller and its component parts.

Fig. 2 shows a detailed view in perspective of the bearing and bearing carrier member having a quarter section cut from the members to disclose the details of construction. Briefly bearing carrier member 21 has an axial portion and a flanged portion, the latter designated 34. Axial holes are provided in this flanged portion as for example at 35, and cap screws are mounted through the seal housing 20 into the track tractor roller 10 to secure the bearing and bearing carrier member to the roller. In the bearing carrier member there are cut-away portions 36 which connect from the external axial portion to the bearing 22. The bearing member 22 has a flanged portion 23, which is secured to the bearing carrier member by means of dowels, as for example at 37. To provide means for the lubricant to pass from the lubricant reservoirs 24 and 25, through the cut-away portion 36 of the bearing carrier there are openings 38 in bearing member 22 to permit this flow of lubricant. On the flanged surface 23 of the bearing member 22, there are a plurality of lubricant grooves designated 39 and 40, which connect at diametrically opposite positions preferably to lubricant passageways 33. These lubricant grooves 39 and 40 are arcuately shaped and permit the flow of lubricant from the bearing surface outwardly along the face of the bearing adjacent to the center thrust portion 16 of the axle 15, and in the vicinity of this axle may be considered to be a low pressure area, since the axle is stationary. As such lubricant will travel to this area and be forced outwardly of the bearing surface to the central lubricant reservoir 25 and will flow through the lubricant passageways, of which there are at least four, though only lubricant passageway 33 is illustrated in Figs. 1 and 2. This explanation of the bearing and bearing carrier members should be sufficient when taken with the details described in connection with Fig. 1. It will be supplemented, however, by the description in connection with Figs. 4 and 5, about to be described.

Fig. 4 is a cross-sectional view through a quarter section of the track tractor roller, showing the outer shell or roller 10 and the lubricant reservoir 24 which is annular in shape and connected to the bearing surface through at least four distinct points. Along the surface of the bearing carrier member 21 there are cut-away portions 36, which are directly connected to this annularly shaped lubricant reservoir. These cut-away portions in the bearing carriers provide some lubricant storage and funnel the lubricant to the bearing surface by means of openings 38, which permit the lubricant to flow from the annular lubricant reservoir 24 to the bearing surface. This bearing surface is designated at 41, and the top portion of the axle 15 is flattened at 42 to permit the passage of lubricant from the opening in the bearing 38 to all surfaces of the bearing along this axial lubricant passage on the top side of the axle. It is readily apparent from the construction of this roller that the axle is stationary, since it is firmly mounted to the track tractor frame, while the roller rotates around the axle and on its under side is in contact with the track of the track laying vehicle, and supports the weight of the tractor.

A further partial cross-sectional view of this track tractor roller is shown in connection with Fig. 5, which is an enlarged cross section of axle 15, looking to the left of this view and facing the flanged portion 23 of the bearing. The axle 15 is shown with its lubricant channel 27 and its flattened portion 42. The bearing itself is bevelled at 43 and provides a small annular chamber to permit improved flow of lubricant to channels 39 and 40. These channels connect the bearing surfaces and the central reservoir 25 and permit the flow of lubricant outwardly along the channels in contact with the stationary enlarged portion of the axle resulting in a low pressure area. The lubricant flows outwardly along this groove to the central lubricant reservoir 25 by the pressure of the lubricant on the bearing surface. Those channels connect to the bearing carrier member at 44, to permit the lubricant to flow directly into the ways in the bearing carrier member shown at 33. At spaced intervals around the surface of the bearing carrier member, there are additional passageways to permit lubricant to flow from the central lubricant reservoir 25 to the outer and larger annular reservoir 24. This reservoir is only one of two since there is a duplicate on the opposite side of the roller mounted radially outwardly of the other bearing and bearing carrier members. From these facts it should be clear that lubricant flows in a natural passage from the annular lubricant reservoir 24 under the pressure of the revolving roller and its accompanying force inwardly through the bearing and bearing carrier member to the axle of the track tractor roller. From this point part of the lubricant flows outwardly, that is, to the ends of the axle and the end of the flattened portion 42, which extends only part way to the seal 19. It is still possible for lubricant to flow outwardly to the vicinity of the seal, and in practice it does because of the clearance between the axle and the bearing. Only a relatively small quantity of lubricant flows through this channel, however, and it passes beneath the lips of the seal to flow away particles of dirt which may become embedded therebeneath. The details of this sealing arrangement will be described in connection with Fig. 3.

Another portion of the lubricant flows axially inward along flattened portion 42 of the axle to the lubricant grooves 39 and 40, then to the central reservoir 25 and passageways 33, to return to the large lubricant reservoir 24. For replenishment of lubricant, the lubricant is added to the fitting 28 on the axle and passes along passageway 27 out the radial passage 32 to the lubricant reservoir 25, to begin its circulation within the track tractor roller.

A preferred type of lubricant seal for use with this track tractor roller is shown in Fig. 3. In this view 50 is a metallic ring having a retaining flange 51 radially inwardly toward the shaft. Securely bonded to the retaining flange is a fibrous sealing ring 52 of elastomer material, annular in shape but L-shaped in cross section, having a central lip 53, which is inclined away from the retaining flange 51 and outwardly of the track tractor roller. Thus it may be seen that the lubricant will extrude past the sealing ring 52 and its central lip 53. Outwardly of this lower part of the L there is a grooved portion 57, behind which is mounted a coil spring 58. At the larger diameter of the L there is a projection 54, which fits into a complementary groove behind the retaining flange 51 and the metallic ring 50. At the smaller diameter of the retaining flange and on the inside surface thereof, there is a small cut-away portion 55, into which the heel of the L-shaped ring is designed to fit. This prevents the lubricant from flowing radially outward along the gap between the elastomer sealing ring 52 and the retaining flange 51, and provides a tight contact therebetween. The central lip 53 has a conical portion 56 directed away from the retaining flange 51, which will flex with the flow of lubricant past the seal. The above mentioned portion 56 contacts the shaft through the lip 53 and is stiffened by a spring 58 against the grooved rear surface of the ring at 57.

Thus it may be seen that this lubricant seal permits a slight extrusion of lubricant past the seal, which will cause any dirt particles which may become embedded beneath the elastomer ring, to flow away. This elastomer seal is particularly useful with hardened type crankshafts and cannot cause dirt to become impacted against the lubricant seals, forcing them into the shaft with an abrasive action. Ordinarily about 14 pounds of lubricant pressure may be retained within a track tractor roller with this sealing arrangement and this is sufficient to carry the track tractor roller over long periods of rough usage without the extrusion of such great quantities of lubricant that the lubricant capacity of the roller has been exhausted.

In addition to this sealing ring there is a second ring or washer of elastomer material spaced outwardly from the sealing ring 52. This second ring 59 is supported by an annularly shaped ring 60, which is approximately parallel to the retaining flange 51. An extension of this ring passes radialy parallel to metallic ring 50 and binds the top of the L-shaped sealing ring 52 into the cut-away portion between the retaining flange and the metallic ring. Outwardly of the sealing ring 59 there is a shaped groove 62 completely encircling the seal. This double lip type elastomer seal permits a slight extrusion of lubricant past the two rings 52 and 59, which flows away dirt from beneath the rings and between the shaft. The outer lip 59 particularly acts to exclude dirt and is unprotected. By this I mean that it has no outer housing member which extends in close proximity to the shaft though housing member 20 does extend to the edge of the annular groove exteriorally of the seal. Thus no dirt or grit can force against the outer surface of this lip to force it into the shaft and wear grooves therein.

This invention may be embodied in other specific forms without departing from the spirit or esesntial characteristics thereof. The present embodiment are, therefore, to be considered in all respects as illustrtaive and not restrictive, the scope of the invention being indicated by the appended claims rather than by the foregoing description, and all changes which come within the meaning and range of equivalency of the claims are, therefore, intended to be embraced therein.

I claim:

In a roller for endless track type vehicles, a non-rotating axle having a center thrust portion, a supporting roller, a pair of flanged bearing members forming confronting bearing surfaces with said axle as well as with the center thrust portion thereof on either side of the center thrust portion, bearing carrier members supporting said flanged bearing members, said flanged bearing members lying between the axle and roller, a seal and seal housings between the said roller and said axle on each of the outer ends of the bearing carrier members, said seal being unprotected in the immediate vicinity of said axle and being of the lip type to permit a slight extrusion of lubricant past said seal, said roller having a plurality of axially spaced annular cavities on the inner surface thereof forming large reservoirs, said bearing carrier members having a plurality of circumferentially spaced cavities or reservoirs formed therein arranged in opposed and connecting relationship with said cavities in the roller to form complementary lubricant reservoirs, connections for lubricant through said bearing carrier members and through the flanged bearing members to the bearing surfaces of the axle, said roller having a central reservoir outwardly disposed from said center thrust portion of the axle, said axle having flat portions on the top surface thereof to provide lubricant passages along the major portion of said axle bearing surfaces, said flanged bearing members having grooves connecting with said flattened portions of the axle to said central reservoir whereby the lubricant is caused to flow from the lubricant reservoirs through the cavities in the bearing carrier members and through the flanged bearing members to the bearing surfaces and along the flattened portions of the axle to the grooves and to the central reservoir.

References Cited in the file of this patent
OTHER REFERENCES

| | | |
|---|---|---|
| 2,054,532 | Baker | Sept. 15, 1936 |
| 2,259,648 | Lucas | Oct. 21, 1941 |
| 2,351,909 | Beretish | June 20, 1944 |